March 17, 1964  M. S. CURTIS ETAL  3,124,985
MACHINE TOOL

Filed May 2, 1958  5 Sheets-Sheet 1

FIG.1

INVENTORS
MYRON S. CURTIS
HARRY SCHOEPE
BY
ATTORNEYS

March 17, 1964  M. S. CURTIS ETAL  3,124,985
MACHINE TOOL

Filed May 2, 1958  5 Sheets-Sheet 2

FIG. 2

INVENTORS
MYRON S. CURTIS
HARRY SCHOEPE
BY
ATTORNEYS

March 17, 1964 M. S. CURTIS ETAL 3,124,985
MACHINE TOOL

Filed May 2, 1958 5 Sheets-Sheet 4

FIG. 7

INVENTORS
MYRON S. CURTIS
HARRY SCHOEPE
BY Hudson, Boughton,
Williams, David & Hoffmann
ATTORNEYS United States Patent Office

3,124,985
Patented Mar. 17, 1964

3,124,985
MACHINE TOOL
Myron S. Curtis, Cleveland, and Harry Schoepe, New Philadelphia, Ohio, assignors to The Warner & Swasey Company, Cleveland, Ohio, a corporation of Ohio
Filed May 2, 1958, Ser. No. 732,737
9 Claims. (Cl. 82—2)

This invention relates to machine tools and more particularly to a lathe capable of having a tool or workpiece support slidably mounted thereupon.

The present invention is particularly concerned with a lathe type of machine tool which is provided with a rotatable spindle or similar member and an inclined bed for one or more tool or workpiece supporting slides.

An object of the present invention is the provision of a machine tool having means for providing a minimum overhang of cutting tools for permitting a larger or heavier cut and minimizing the resultant forces developed during a machining operation on a workpiece with a resulting longer tool and machine life and a higher efficiency and accuracy of operation.

Another object of the present invention is to provide a new and improved machine tool having the advantages of permitting an operator to more closely approach the ways for loading and gauging purposes, increased visibility of work and cutting tools, better chip gravitation and disposal, machining of larger workpieces and greater machining cuts by permitting the tool supports to be disposed closer to the ways, and/or V way guide effect while using square ways.

Another object of the present invention is to provide a machine tool which allows much heavier cuts to be taken on workpieces than is generally permissible with known conventional machines of the same size and type.

Another object of the present invention is to provide a machine tool having a dual slide arrangement including an offset turret for permitting the work tools on the slides to be brought into closer proximity with each other and/or for the substantial balancing of forces generated in a cutting operation.

A further object of the present invention is the provision of means for shortening the distance between the cutting tools and the guideways of a machine tool by using an offset turret and support wing and thereby decreasing the forces on the guideways of the machine tool, and reducing the friction losses and power required to move the offset turret on the guideways.

Another object of the present invention is to provide a machine tool having the advantage of allowing a greater clearance for a square turret on the cross slide by the use of an offset turret on the turret slide.

Another object of the present invention is to provide a new and novel inclined bed for a machine tool of the type having a rotatable spindle and which inclined bed is essentially comprised of a plurality of longitudinally extending integrally connected beams of polygonal and more particularly triangular, cross section for rigidly supporting longitudinally extending guideways that are adapted to have at least one slide mounted thereupon.

Another object of the present invention is the provision of a new and novel inclined bed for a machine tool of the type having a rotatable spindle and which machine tool inclined bed is adapted to support a turret having a rotation axis disposed to one side of the rotation axis of the rotatable spindle of the machine tool and a carriage for a cross slide disposed on the other side of the spindle axis between the turret and spindle and which cross slide carriage does not extend substantially beyond the spindle axis and hence does not interfere with the operation of any of the tools carried by the turret.

Another object of the present invention is to provide a new and novel wing tool support for a turret in the arrangement set forth in the preceding object for permitting at least one tool to be secured thereto having a longitudinal axis transverse to the spindle axis for cutting operations on the same side of the spindle axis as the wing tool support.

The invention further resides in novel features of the construction and in the combination and arrangement of the parts thereof, and further objects and advantages of the invention will be apparent to those skilled in the art to which it pertains from the following description of the present preferred embodiment which is described with reference to the accompanying drawings, which form a part of this specification, and wherein:

Before explaining in detail a preferred embodiment of the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Figure 1:
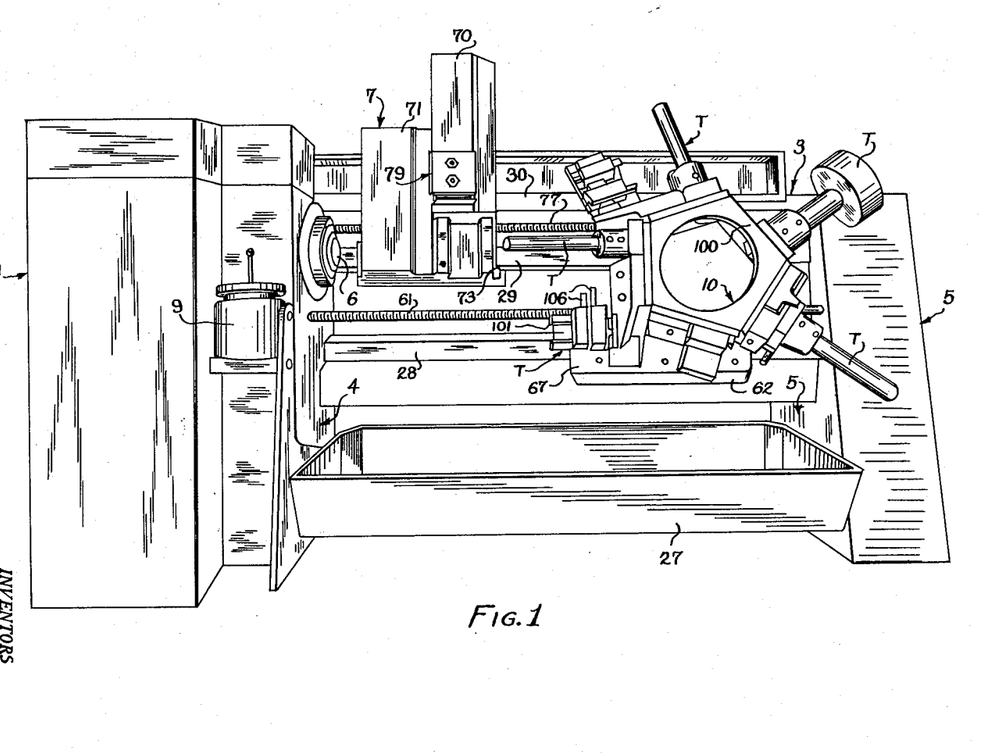
FIG. 1 is a front elevational perspective view of a lathe type of machine tool embodying the present invention.

Referring to FIG. 1 of the drawings, the turret lathe type of machine tool embodying the present invention comprises an elongated bed 3 fixedly supported in a raised horizontal position on its one end by a pedestal-like headstock 4 and on its opposite end by a somewhat smaller pedestal 5. A spindle 6 is supported in the upper portion of the headstock 4 and adapted to rotate about a substantially horizontal axis, the latter also housing suitable drive means and manually and/or automatically operative control means 9 for the drive means adapted to regulate the rate of rotation of spindle 6, as understood in the art. The spindle 6, or suitable chucking member adapted to be attached thereto, in a known manner, rotatably drives and by way of example only, supports a workpiece while machining operations are performed thereon by tool devices, as indicated at 7 and 10, to be described in more detail hereinafter, and which are movably supported on the bed 3 in a manner now to be described. However, it is to be understood that a tool may be attached to spindle 6 and a workpiece secured to the bed 3.

Figure 2:
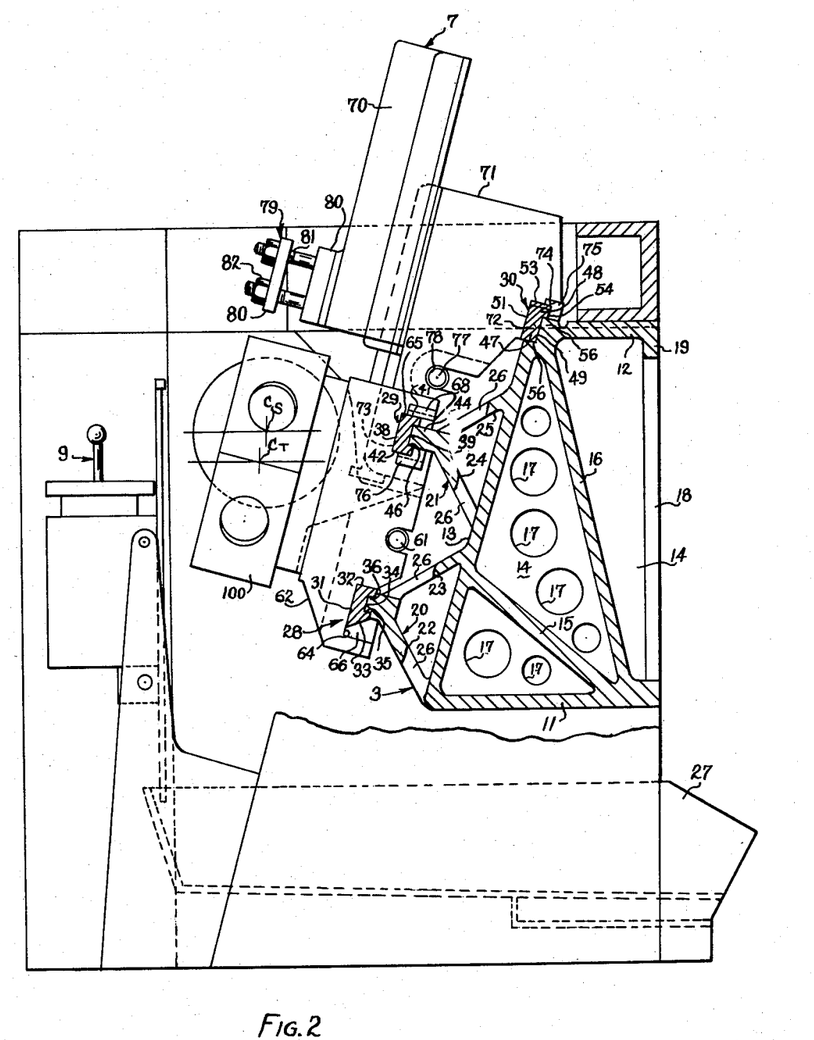
FIG. 2 is a partially broken away end view of the machine tool in FIG. 1, for showing the preferred spaced and inclined placement of the guideways on the machine bed which support the tool supporting slides in a near vertical plane.

The bed 3, as shown cross-sectionally in FIG. 2 comprises a horizontal extending base plate 11 and a horizontal top plate 12 connected together at the forward edges thereof by an inclined wall 13. The lateral ends of the base plate 11, top plate 12, and inclined front wall 13 are each essentially coplanar and are rigidly secured by two essentially vertically extending end plates 14, of which only one is shown. The inclined wall 13 and base and top plates 11, 12 together with end walls 14 form a longitudinally extending beam generally U-shaped in cross section.

The inclined wall 13 is reinforced or braced by an inclined web 15 having a longitudinal edge integrally connected with the rear face of wall 13 and another longitudinally extending edge integral with the base plate 11. The web 15 reinforces and braces the wall 13 against deflection, and more especially against deflection towards the rear of the machine tool. The base plate 11, wall 13 and web 15 form a triangular shaped, longitudinally extending beam which is very rigid and resists deflection in a transverse direction. A second web is disposed rearwardly of wall 13 and web 15, has its upper longitudinal edge connected at the intersection of wall 13 and top plate 12 and its lower longitudinally extending edge connected to the base plate 11, near the rear edge thereof. The web 16 is inclined forwardly from the lower edge thereof towards the front wall 13 and extends the full length of bed 3; the ends of the webs 15 and 16 being rigidly secured to end plates 14. The plate 11, wall 13 and web 16 form a second triangular shaped longitudinally extending beam which is very rigid and resists deflection in a transverse direction. Another triangular shaped beam is formed by webs 15 and 16 with wall 13.

End plates 14 may be provided with a plurality of circular openings 17 between the webs 15 and 16, and between the web 15 and base plate 11, for reducing the mass or weight of the end plates. The back 18 of the bed 3 is essentially open with the exception of a vertically downwardly extending flange portion 19 integral with the rear edge portion of top plate 12, since the front wall 13 of bed 3 is supported by the webs 15 and 16 rigidly secured to base plate 11, in addition to being directly supported by the base plate 11. The entire bed 3 is connected to the headstock 4 and pedestal 5 in a conventional manner, such as by stud bolts, not shown.

The front face or wall 13 of bed 3 is provided with a pair of longitudinally extending triangular-shaped truss-like support structures or beams 20 and 21, for a purpose to be described. The two truss-like structures 20 and 21 are disposed in parallel, vertically spaced apart relationship with each other. The beam structure 20 is comprised of an upwardly and forwardly inclined lower wall 22 and a downwardly and forwardly inclined upper wall 23 joined at the forwardly and longitudinally extending edges thereof, the rear edge portions of the walls 22 and 23 being integral with the front face of inclined wall 13. Likewise, the truss-like structure 21 comprises an upwardly and forwardly inclined bottom wall 24 and a downwardly and forwardly inclined top wall 25 joined at the forward edges thereof, and with the rear, longitudinally extending edges being integral with the front face of inclined wall 13. The walls 24 and 25 of the truss-like structure 21 are disposed in such a manner as to lie between the upper horizontal edge portion on wall 13 and the line of intersection of the web 15 therewith. However, the truss-like structure 20 is connected at the lowermost and forward edge portion of base plate 11 and downwardly and forwardly extending wall portion 23 is connected to the front face of wall 13 immediately above the junction of web 15 with wall 13 and below the junction of wall 24 of formation 21 with wall 13.

Each of the wall portions 22, 23 and 24, 25 of truss-like support structures 20, 21 respectively, which are substantially of isosceles triangle cross section, are provided with openings 26 for permitting chips and cooling fluid to pass therethrough to a chip pan 27, of conventional shape, secured beneath the bed 3.

The outermost edge or apex portions of beams 20 and 21 are formed in such a manner as to have means for supporting a pair of guideways 28 and 29, respectively, which extend longitudinally of the bed and are transversely spaced in parallel relationship with each other, both guideways 28, 29 preferably lying in an inclined plane that extends upwardly and rearwardly from a horizontal, transverse plane on the bed. A third guideway 30 is formed in the forward edge portion of top plate 12 and the upper edge portion of wall 13, which guideway is disposed rearwardly and above the first two co-planar guideways. The bed 3 is thereby provided with a bottom guideway 28, intermediate guideway 29, and a top guideway 30. The guideways are normally formed of a suitable hardened metallic material such as tool steel, and in the present embodiment are adapted to be rigidly fastened to the bed, although it is also contemplated that the guideways may be formed integral with the bed.

The bottom guideway 28 is polygonal and, more specifically, trapezoidal in cross-sectional configuration and has a primary supporting surface 31, an upper minor supporting surface 32, which is substantially perpendicular to the surface 31, a lower minor supporting surface 33 extending obliquely to primary surface 31, and a base 34 disposed parallel to surface 31. Each of the supporting surfaces lies substantially flat and extends longitudinally along the guideway 28. Guideway 28 is adapted to be mounted upon the apex portion of truss-like support 20 and for this purpose the latter is preferably provided with a raised shoulder 36 adapted to interfit a recess 35 formed in a guideway base 34. The bottom guideway 28 is rigidly attached to the bed 3 by any suitable fastening means in such a manner that its supporting surface 31 extends longitudinally along the bed 3 and lies in a plane inclined at approximately 75 degrees, for example, from a horizontal transverse plane on the bed and towards the rear of the latter.

The intermediate guideway 29 has a substantially rectangular cross section, and also has a primary supporting surface 38. The guideway is also provided with a base 39 disposed essentially parallel to the surface 38 thereof and integrally interconnected by parallel upper and lower supporting surfaces 41 and 42, respectively. The supporting surfaces for the intermediate guideway 29 extend longitudinally of the machine. The intermediate guideway 29 is the forwardmost portion of truss-like support structure 21 mounted on bed 3 so as to extend longitudinally therealong in parallel and transversely spaced relation to the bottom guideway 28, and for this purpose the portion at the junction between its bottom wall 24 and top wall 25 is integrally formed with a forwardly and upwardly inclined rail 44 which extends longitudinally of the bed 3 and parallel to the aforementioned shoulder 36. The rail 44 is adapted to interfit a similarly shaped recess 46 provided in the base 39 of the intermediate guideway 29 and suitable fastening means rigidly attach the latter to the bed 3 such that its supporting surface 38 is in the same vertically inclined plane as the supporting surface 31 of the bottom guideway 28.

The top guideway 30 has a inverted L-shaped cross-sectional configuration and is attached to bed 3. Guideway 30 comprises a leg portion 47 integrally formed with a base portion 48 extending perpendicularly therefrom and providing a recess 49 which extends longitudinally along the guideway 30. The guideway 30, further, is provided with a primary supporting surface 51 on its leg portion 47, and upper and rear guiding surfaces 53 and 54 formed on the base portion 48. The rear guiding surface 54 is parallel to the supporting surface 51 and is interconnected thereto by the upper guiding surface 53 extending perpendicularly therebetween. The top guideway 30 is adapted to be attached to the upper part of the bed 3 and for this purpose the top plate 12 of the bed at its forward longitudinal edge is spaced rearwardly of the front wall of bed 3 and is provided with a shoulder portion 56 which is inclined downwardly and forwardly of the machine parallel to the supporting surfaces 31 and 38 of the bottom and intermediate guideways 28 and 29, respectively, but rearwardly thereof. Shoulder portion 56 is adapted to interfit the recess 49 of the top guideway 30 and any suitable fastening means may be utilized and interconnected therebetween to rigidly secure the latter to bed 3.

With reference to FIG. 2, it is seen that, with the top guideway 30 mounted upon bed 3 in the manner described, major flat tool supporting surface 51 is inclined downwardly and forwardly relative to the machine at substantially the same angle of inclination as that of major surfaces 31 and 38 of the coplanar spaced-apart bottom and intermediate guideways 28 and 29, respectively, but in a plane that is spaced rearwardly therefrom.

The tool device 7 comprises a movable cross slide 70 dove-tailed to a horizontally slidable carriage or support member 71. As best shown in FIG. 2, carriage 71 is provided with a recess 72 comprising a pair of normally disposed plane surfaces in mating or complementary relationship with supporting surface 51 and upper supporting surface 53 of guideway 30. A second recess 74 formed in support member 71, also comprising flat surfaces in substantially perpendicular relationship to each other, is for accommodating a longitudinally extending cap 75 in juxtaposition with surfaces 53 and 54 of guideway 30 and the upper planar surface of shoulder portion 56 in a manner well known to those skilled in the art.

Moreover, a recess 73, FIG. 2, having surfaces arranged perpendicularly to each other and similar to recess 72, is formed in a lower portion of member 71 for the seating thereof upon intermediate guideway 29. A longitudinally extending gib 76, FIG. 2, is operatively interposed between correspondingly formed walls or surfaces in member 71 and the lower sides or surfaces of guideway 29 and inclined rail 44 in a conventional manner, also well known to those skilled in the art.

In order to move the support member 71 in sliding relationship along ways 29 and 30, the machine is provided with a longitudinally extending driven screw 77 supported therein in a conventional manner. Member 71 has a threaded nut-like recess 78 in a rearwardly facing or underside part thereof which mates with and is driven by the screw 77. Thus the member 71 which carries cross slide 70 can be moved to any point along the length of guideways 29 and 30 by rotating screw 77 in a selected direction of rotation. The means for driving screw 77 are not shown in the accompanying drawings for purposes of clarity.

Figure 8:
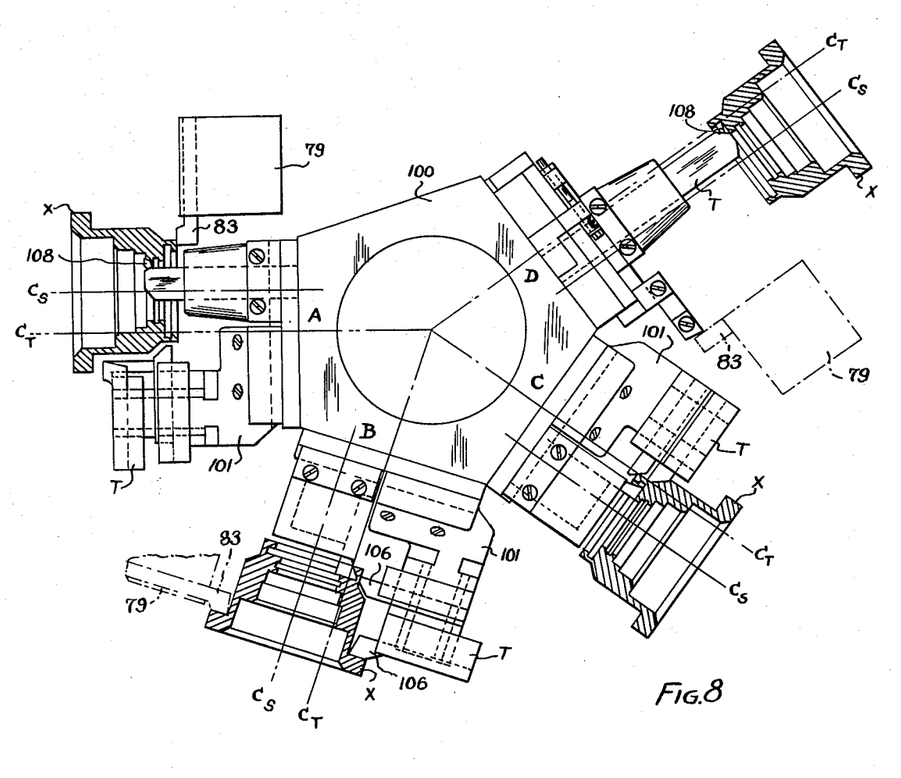
FIG. 8 is a plan view of a multifaced, and more especially a pentagonal turret, adapted to be mounted on the supporting guideways of FIG. 1, but shows in diagrammatic form several types of tooling assemblies secured to the various turret faces and how each may be disposed in operative engagement with a workpiece supported in a spindle, not shown, and further shows a square turret adapted to be mounted on another of the tool supporting slides and its position relative to the multiface turret when moved to a machining operation on the workpiece.

The cross slide 70 is provided with a conventional tool supporting assembly or square turret 79 having a pair of plates or pads 80 connected together by bolts 81 and nuts 82 on the outer face thereof for securing a tool, not shown, in a toolholder or the like therebetween. A plurality of tools 83, illustrated in FIG. 8, are secured to the rotatable square turret 79 which will be more fully described hereinafter.

The tool device 10 is adapted to be mounted on the bottom and intermediate ways 28 and 29 and moved longitudinally therealong by a lead screw 61 drivingly connected thereto and rotatably actuated by suitable drive means housed within the headstock 4 in a manner well known in the art, to and from the spindle to perform machining operations on a workpiece rotatably driven by the latter. Tool device 10, in its instant form, comprises a saddle or slide member 62 having a pair of spaced apart parallel grooves 64 and 65 which extend longitudinally of the base and which embrace the bottom and intermediate guideways 28 and 29, respectively. A suitable gib 66 disposed in groove 64 and rigidly attached to the slide 62 has an upwardly facing surface complemental in configuration with and slidably engaging the lower supporting surface 33 of the guideway 28 and effective to slidably secure the slide 62 to the latter and also to prevent transverse movement therebetween. Likewise, a cap 68 is disposed in groove 65 and rigidly attached to the slide 62, being provided with surfaces disposed perpendicularly to each other and slidably engaging the upper supporting surface 41 and base 39 of the intermediate guideway 29, and is also similarly effective to secure the slide 62 to the latter for preventing transverse movement therebetween.

The tool device 10 also includes a turret 100 which, in its illustrated form, is of pentagonal configuration having means on each face thereof for supporting one or more cutting tools as indicated generally by the reference character T. As shown in FIG. 2, turret 100 has been mounted upon the forwardly inclined surface of the slide 62 so that its center $C_T$ lies in a plane that is spaced below the center $C_S$ of the spindle 6. The turret 100, in addition is adapted to be rotated about the central axis thereof, disposed perpendicular to the plane of the supporting guideways 28 and 29 for moving the cutting tools T supported thereon in any desired sequence into a cutting position relative to a workpiece W, shown in FIGS. 5 and 6. The indexing movement may be accomplished by any suitable indexing mechanism such as that forming the subject matter in the copending application of Robert E. Diener, Serial No. 728,422, filed on April 14, 1958, now Patent No. 2,940,341.

Figure 5:
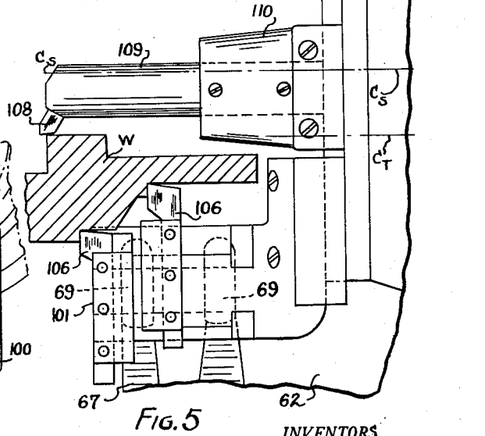
FIG. 5 is a fragmentary view in front elevation showing one set of cutting tools mounted on one face of the multiface turret of FIG. 4 and in machining engagement with several exterior and interior surfaces of a workpiece adapted to be supported in the spindle of the machine tool embodying the present invention, and further shows a preferred mounting of the turret on one of the tool supporting slides such that the center line of the turret is spaced below the center line of the spindle.

The saddle 62 is also integrally formed with a wing element 67, FIGS. 1 and 5, projecting longitudinally along the bed 3 from the end of saddle member 62 towards the headstock 4 and which is supported upon the bottom guideway 28. Wing element 67 is provided with a pair of raised longitudinally spaced shoulders which extend upwardly and transversely of the saddle 62 from the top of the latter wherein the upper end of each is provided with a flat surface for forming a pair of rest pads 69 which lie in a plane that is identical in inclination to the plane of the bottom and intermediate guideways 28 and 29. The rest pads 69 are disposed and so positioned relative to the turret that when the latter is indexed to bring a set of cutting tools T into a machining position, as shown in FIG. 5, a supporting member or wing element 101 forming a part of tools T slides over and rests upon pads 69.

Figure 7:
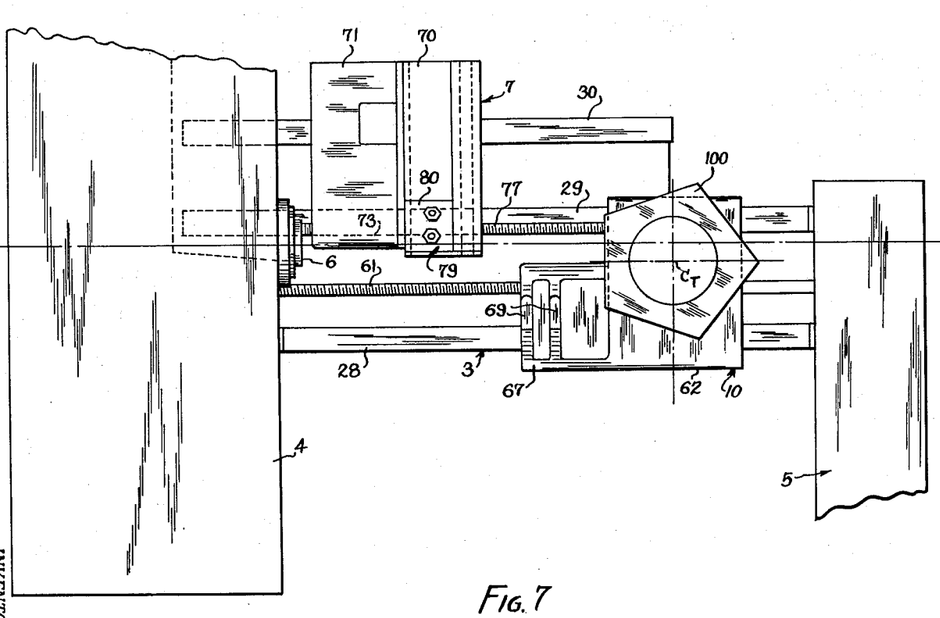
FIG. 7 shows the machine tool with parts removed for showing the turret and cross slide in true plan view whereby the distance between the center line of the spindle and the tool supporting turret is clearly illustrated.

Although not shown, the undersurface of each of the wing-like supporting members 101 is preferably constructed having spaced apart flat surfaces that are similar in configuration to the rest pads 69 and are adapted to overlie and seat thereupon. The mass of each of the several parts comprising the structure of the tool device 10, as just described, is preferably located relative to the mass of the remaining parts and of a magnitude to provide tool device 10 with a center of gravity located on a vertical line that is spaced rearwardly of the center line $C_s$ of spindle 6, as best seen in FIG. 7, and to the left of the turret center $C_t$, as best viewed in FIG. 1, extending between the supporting guideways 28 and 29 and at a point on line $C_T$ that is closely adjacent the bottom guideway 28.

By disposing the tool device 10 in a near vertical plane on the bottom and intermediate guideways 28 and 29, and by utilizing the aforedescribed preferred construction, the effects of the cutting force and/or forces resulting from the tools T acting on a workpiece and reacting upon the supporting guideways and associated structure of the tool device are substantially reduced. The manner in which the instant machine tool occasions this result will become more apparent as a comparison between a conventional machine tool and the machine tool of the present invention, both performing the same machining operations on an identical workpiece W, is hereinafter described.

Figure 3:
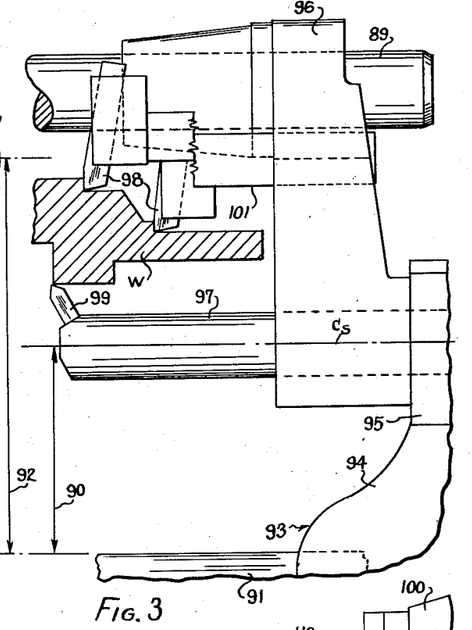
FIG. 3 is a fragmentary front elevational view of a tool device for a conventional machine tool and shows the cutting tools thereof in operative engagement with various parts of a workpiece, the latter being shown in section.
Figure 4:
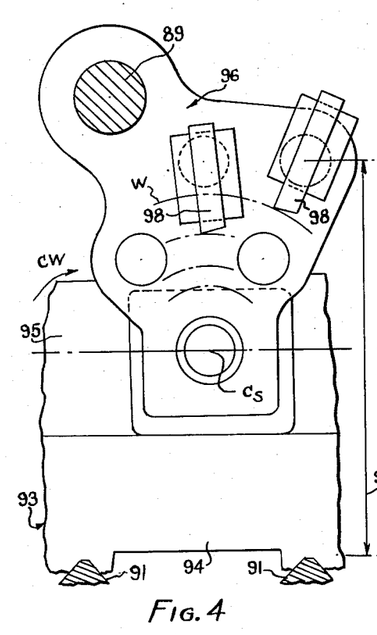
FIG. 4 is an end view of the tool device of FIG. 3, and further shows the horizontally extending guideways of the conventional machine tool in their relative position with respect to the tool supporting structure to more clearly show the distance between the point of application of a tool to the workpiece and the surface of the horizontal guideways.

In FIGS. 3 and 4, a conventional machine tool is shown having a pair of transversely spaced guideways 91 disposed in a horizontal plane and mounting a tool device indicated generally by the reference numeral 93, the latter comprising a saddle member 94 slidably supported on the guideways 91 and a multiface turret 95 rotatably indexibly mounted on the slide 62. A tooling arrangement is shown attached to a face of the turret and includes a tool support member or multiple tool holder 96 rigidly fastened to the latter and extending upwardly from the guideway 91. Tool holder 96 carries a tool 99 and bar mounting member 97 therefor, the latter being disposed at the level of the spindle center $C_s$ above the guideways 91 and below a pair of facing tools 98. Holders for facing tools 98 and the multiple tool holder 96 require the additional support of a pilot bar 89, as is well known in the art, spaced above the tool 99, to give the necessary rigidity thereto. The turret 95 is shown indexed to a position wherein the tools 98 and 99 are moved into cutting engagement with the various corresponding portions of the workpiece W supported in the machine spindle, not shown, and rotated in a clockwise direction, as viewed in FIG. 4.

With the boring tool 99 performing a cutting operation on the workpiece W in the manner shown in FIG. 3, the forces resulting therefrom and applied to the support member 96 at a point spaced vertically above the guideways 91, a distance indicated by the reference numeral 90, creates a torque which is applied to the guideways 91 and the tool device 93. In like manner, with the facing tools 98 each performing a cutting operation on the workpiece W, the resultant forces of each operation acting on the support member 96, a vertical distance above the guideways as indicated at 92, produce a torque which is also applied to the guideways 91 via tool device 93.

The torques developed during the cutting by the facing tools 98 in the instant tooling arrangement act in substantially the same direction and may be additive in effect, whereas the torque produced by the operation of the boring tool 99 acts in addition to the foregoing torques and is normally smaller in magnitude relative thereto. Consequently, a resultant torque is produced by the foregoing multiple cutting operation which tends to lift the tool device 93 off the guideways 91. However, since the tool device 93 is fastened to the guideways 91 in a manner well known in the art, the resultant torque acts to rotate the mass of the tool device. Therefore, in order for the conventional machine tool apparatus to perform a highly efficient and accurate machining operation and to overcome the tendency to rotate when utilizing the foregoing tooling arrangement, the mass of the tool device 93 must necessarily be substantially large, barring the above mentioned fastening means which will hold the tool device onto the guideways.

Figure 6:
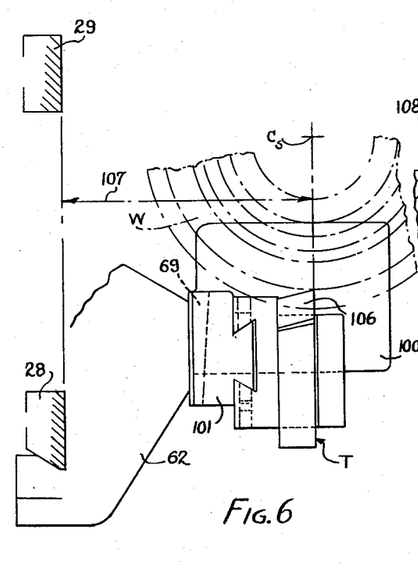
FIG. 6 is a fragmentary end view of FIG. 5 showing the turret mounted on the bottom and intermediate guideways of the machine bed, whereas the guideways are shown disposed in a vertical plane so as to more clearly show the distance between the point of application of a tool to the workpiece and the surface of the guideways.

Referring now to FIGS. 5 and 6, the machine tool of the present invention is similarly shown adapted to perform substantially the same machining operation on the workpiece W as that performed by the conventional machine tool just described. The turret 100 in the instant structure is provided with a tooling arrangement comprising a pair of tools 106 carried by the supporting member 101 and moved to a cutting position with the same corresponding portions of the workpiece W as that engaged by the facing tools 98 of the conventional machine illustrated in FIGS. 3 and 4. The supporting member 101 of tool T is seated upon the rest pads 69. Likewise, the tools 106 are shown disposed below the spindle center $C_s$, and spaced from the bottom and intermediate guideways 28 and 29 a rectilinear distance substantially as indicated by the reference numeral 107 in FIG. 6. The tooling arrangement in the present form of tool device 10 also includes a boring tool, as indicated at 108, carried within a bar support 109, the latter being rigidly secured to a mounting boss 110, which in turn, is securely fastened to the turret 100 in juxtaposition to the supporting wing member 101. The boring tool 108 is also shown in cutting engagement with the same part of the workpiece as that engaged by the boring tool 99 in the aforementioned conventional machine tool. However, the boring tool 108 is disposed below the spindle center $C_s$ and spaced from guideways 28 and 29 substantially the same distance 107 as that of the tools 106.

From the foregoing description of the preferred embodiment of the present invention and from the various views shown, it is apparent that a tool mounted on the cross slide 70 is permitted to come into closer proximity with the tools 106 and 108 carried by turret 100 than in a conventional turret-type machine tool having a cross slide, not shown. Moreover, the tools 106 and 108, as best illustrated in FIG. 5, are permitted to be arranged in substantially coplanar relationship parallel to the bed 3 of the machine tool with resulting advantages not obtained in a conventional arrangement illustrated in FIGS. 3 and 4. For example, larger cuts can be made because the wing tools push directly upon the bed and the overall resultant torque is reduced; furthermore, better chip disposal, greater visibility of work, and other advantages result from the aforedescribed structural arrangement.

FIG. 8, for purposes of further illustrating the invention, discloses turret 100 with four faces or stations, A, B, C and D, provided with wing tools T for performing various machining operations on a different workpiece X. Further, a rotatable square turret 79 is mounted on a cross slide 70, not shown in FIG. 8, for performing independent machining operations on workpiece X simultaneously with the tools 106 and 108 mounted on turret 100. The illustrative arrangement of the turret 100 and turret 79 relative to a workpiece X in FIG. 8 clearly shows, by the use of wing tools T, how closely the various wing tools T and square turret tools 83 can be arranged without interference. Moreover, the resulting forces generated by the tools on the workpiece X can be substantially balanced and reduced to a minimum with the wing tools T bearing directly upon the bed as heretofore pointed out.

Over and above the foregoing advantages, the various tools are clearly visible to the operator due to the inclination of the turrets 100 and 79 in a direction substantially normal to the operator's line of sight so that the tool holders are seen in full view. Furthermore, it is apparent that the chips will be free to fall away or gravitate from the cutting tools since the latter are inclined to the horizontal.

While we have shown and described a specific embodiment in accordance with our invention, it is understood that the same is susceptible of many changes and modifications, as known to a person skilled in the art, and we intend to cover such changes and modifications as defined in the appended claims.

Having thus defined our invention, what we claim is:
1. In a machine tool, a bed having a longitudinally extending base support, spaced longitudinally extending first and second walls rising from parallel first lines of juncture with said support and inclined towards each other to converge toward a third line of juncture extending parallel to said first lines to define a bed triangular in cross section, said first wall being a plate-like member, a plurality of ways extending parallel to said lines adjacent the outer side of said first wall and having way surfaces extending parallel to the plane of said first wall, one of said ways being supported adjacent said third line of juncture and at least one of said ways being offset from the plane of said first wall, each offset way having a support structure connecting the way to said first wall comprising longitudinally extending support members between the way and said first wall and diverging from each other proceeding from the way and joining said first wall along spaced parallel lines.

2. In a machine tool, a longitudinally extending base support, a vertically inclined plate-like portion extending upwardly from said support, vertically spaced longitudinally extending portions supported by said plate-like portion and defining with the latter upper and lower supports triangular in cross section with the apexes thereof extending parallel to said plate-like portion, a lower way supported by the apex of the lower support, an intermediate way supported by the apex of the said upper support, said lower way and said intermediate way having major slide supporting surfaces located in a common inclined plane parallel to the plane of said inclined plate-like portion, an upper way extending parallel to said intermediate way and supported by said plate-like portion, said upper way having a major slide supporting surface which lies in a plane substantially parallel to said plate-like portion, and a wall extending upwardly from said support and converging with said plate-like portion adjacent said upper way to form with said base support and said plate-like portion a substantially triangular structure with the apex thereof adjacent said upper way, said lower and intermediate ways being adapted to support one slide and said upper and intermediate ways being adapted to support a second slide.

3. In a machine tool, a longitudinally extending support, a vertically inclined plate-like portion extending upwardly from said support, vertically spaced longitudinally extending portions supported by said plate-like portion, said portions being triangular in cross section and the apexes thereof extending away from said plate-like portion, a lower way supported by the apex of the lower of said portions, an intermediate way supported by the apex of the other of said portions, said lower way and said intermediate way having major slide supporting surfaces located in a common inclined plane parallel to the plane of said inclined plate-like portion, support means supported by said plate-like portion above said intermediate way and extending longitudinally, an upper way extending parallel to said intermediate way and supported by said support means, said upper way having a major slide supporting surface which lies in a plane substantially parallel to said plate-like portion, a wall extending upwardly from said support and converging with said plate-like portion adjacent said upper way forming a first substantially triangular structure with the apex thereof adjacent said upper way, and brace means extending from the juncture of said wall and said support to said plate-like portion forming a second substantially triangular structure within said first triangular structure, said lower and intermediate ways being adapted to support one slide and said upper and intermediate ways being adapted to support a second slide.

4. In a machine tool, a rotatable spindle for rotating a workpiece, a longitudinally extending bed having first and second spaced ways thereon extending in a direction parallel to the axis of rotation of said spindle, a turret carriage mounted on said ways and movable therealong, a turret rotatably mounted on said carriage and having a plurality of tool supporting surfaces which upon rotation of said turret sequentially take a position wherein each supporting surface lies in a plane perpendicular to the axis of said spindle and faces said spindle, said carriage having a portion which extends beyond the tool supporting surface which faces said spindle, first and second toolholders operatively connected to one of said tool supporting surfaces, the connection of said first toolholder to said one of said tool supporting surfaces intersecting said spindle axis and said first toolholder is positioned to support a tool which engages the workpiece within the outer periphery thereof, the connection of said second toolholder to said one of said tool supporting surfaces being offset from said spindle axis and said second toolholder being disposed to the side of the spindle axis toward and over said second way and adapted to support a tool which engages the outer periphery of the workpiece at a point substantially on a line tangent to the workpiece and which intersects the plane of the ways between said ways with the rotation of said workpiece being downwardly toward said second way at said point, and supporting pad means disposed to one side of said axis and located on said portion of said carriage forwardly of the tool supporting surface facing the spindle and adjacent said second way intermediate said second toolholder and said second way, said second toolholder having a bearing surface on the underside thereof which engages said supporting pad means on said carriage when the tool supporting surface of the turret on which said second toolholder is mounted is rotated into position facing said spindle and the tool supported thereby operates on the outer periphery of the workpiece and forces created by the tool engaging the outer periphery of the workpiece are transmitted downwardly to said pad means and downwardly through said pad means to said second way.

5. In a machine tool, a rotatable spindle for rotating a workpiece, a longitudinally extending bed having first and second spaced ways thereon extending in a direction parallel to the axis of rotation of said spindle, a turret carriage mounted on said ways and movable therealong, a turret rotatably mounted on said carriage and having a plurality of tool supporting surfaces which upon rotation of said turret sequentially take a position wherein each supporting surface lies in a plane perpendicular to the axis of said spindle and faces said spindle, said carriage having a portion which extends beyond the tool supporting surface which faces said spindle, first and second toolholders operatively connected to one of said tool supporting surfaces, said first toolholder being supported in a toolholder opening on one of said tool supporting surfaces, the center of said toolholder opening being located substantially on the axis of rotation of said spindle with the center of rotation of said turret offset from said axis toward the side of said second way, said first toolholder being positioned to support a tool which engages a workpiece within the outer periphery thereof, said second toolholder being disposed to the side of the spindle axis adjacent said second way and adapted to support a tool which engages the outer periphery of the workpiece at a point substantially on a line tangent to the workpiece and which intersects the plane of the ways between said ways and the rotation of said workpiece being toward said second way at said point, supporting pad means disposed to one side of said axis located on said portion of said carriage adjacent said second way intermediate said second toolholder and said second way, said second toolholder having a bearing surface which engages said supporting pad means on said carriage when the tool supporting surface of the turret on which said second toolholder is mounted is rotated into position facing said spindle and the tool supported thereby operates on the outer periphery of the workpiece and the forces created by the tool engaging the outer periphery of the workpiece are transmitted through said pad means to said second way, a third way extending in a direction parallel to said first and second ways, said third way being spaced from said first way on the side thereof opposite the side on which said second way is located, a cross slide carriage mounted on said third way and said first way for movement therealong and adapted to carry tools to engage portions of the periphery of the workpiece, and the offset of the center of rotation of said turret from the axis of rotation of said spindle toward said second way providing for said cross slide carriage to move into close proximity to said turret.

6. In a machine tool, a rotatable spindle for rotating a workpiece, a longitudinally extending bed having first and second spaced ways thereon extending in a direction parallel to the axis of rotation of said spindle, a turret carriage mounted on said ways and movable therealong, a turret mounted on said carriage and having a plurality of tool supporting surfaces which upon rotation of said turret sequentially take a position wherein each supporting surface lies in a plane perpendicular to the axis of said spindle and faces said spindle, said carriage having a portion which extends beyond the tool supporting surface which faces said spindle, a toolholder operatively connected to one of said tool supporting surfaces, said toolholder being disposed between the plane of said ways and a parallel plane through the spindle axis and offset from the spindle axis toward and over said second way and adapted to support a tool in a position wherein the cutting edge thereof lies between said planes and for engaging the outer periphery of the workpiece at a point substantially on a line tangent to the workpiece and which intersects the plane of the ways between said ways with the rotation of said workpiece being downwardly toward said second way at said point, and supporting pad means disposed to the side of said axis toward said second way and located on said portion of said carriage forwardly of the tool supporting surface when facing the spindle and adjacent said second way intermediate said toolholder and said second way, said toolholder having a bearing surface on the underside thereof which engages said supporting pad means on said carriage when the tool supporting surface of the turret on which said toolholder is mounted is rotated into position facing said spindle and the tool supported thereby operates on the outer periphery of the workpiece and the forces created by the tool engaging the outer periphery of the workpiece are transmitted downwardly to said pad means and downwardly through said pad means to said second way.

7. In a machine tool, a rotatable spindle for rotating a workpiece, a longitudinally extending bed having first and second spaced ways thereon extending in a direction parallel to the axis of rotation of said spindle, a turret carriage mounted on said ways and movable therealong, a turret mounted on said carriage and having a plurality of tool supporting surfaces which upon rotation of said turret sequentially take a position wherein each supporting surface lies in a plane perpendicular to the axis of said spindle and faces said spindle, said carriage having a portion which extends beyond the tool supporting surface which faces said spindle, a toolholder operatively connected to one of said tool supporting surfaces, the connection of said toolholder to said one of said tool supporting surfaces being offset from said spindle axis and said toolholder being disposed to the side of the spindle axis toward and over said second way and adapted to support a tool which engages the outer periphery of the workpiece at a point substantially on a line tangent to the workpiece and which intersects the plane of the ways between said ways with the rotation of said workpiece being downwardly toward said second way at said point, supporting pad means disposed to one side of said axis and located on said portion of said carriage forwardly of the tool supporting surface facing the spindle and adjacent said second way intermediate said toolholder and said second way, said toolholder having a bearing surface on the underside thereof which engages said supporting pad means on said carriage when the tool supporting surface of the turret on which said toolholder is mounted is rotated into position facing said spindle and the tool supported thereby operates on the outer periphery of the workpiece and the forces created by the tool engaging the outer periphery of the workpiece are transmitted downwardly to said pad means and downwardly through said pad means to said second way, a third way extending in a direction parallel to said first and second ways, said third way being spaced from said first way on the side thereof opposite the side on which said second way is located, and a cross slide carriage mounted on said third way and said first way for movement therealong and adapted to carry tools to engage portions of the periphery of said workpiece on the side of the workpiece opposite the side engaged by the tools in said toolholder, said first, second and third ways being inclined vertically to provide ready access to said cross slide carriage.

8. In a machine tool, a rotatable spindle for rotating a workpiece, a longitudinally extending bed having first and second spaced ways supported thereby extending in a direction parallel to the axis of rotation of said spindle, a turret carriage mounted on said ways and movable therealong, a turret rotatably mounted on said carriage and having a plurality of tool supporting surfaces which upon rotation of said turret sequentially take a position wherein each supporting surface lies in a plane perpendicular to the axis of the said spindle and faces said spindle, at least one of said tool supporting surfaces having a toolholder opening therein, the center of said toolholder opening being located substantially on the axis of rotation of said spindle with the center of rotation of said turret offset from said axis to the side of said second way, a toolholder positioned in said opening to support a tool which engages the workpiece within the outer periphery thereof, a third way extending in a direction parallel to said first and second ways, said third way being spaced from said first way on the side thereof opposite the side on which said second way is located, and a cross slide carriage mounted on said third way and said first way for movement therealong and adapted to carry tools to engage portions of the periphery of said workpiece, the offset of the center of rotation of said turret from the axis of rotation of said spindle toward the side of said second way providing for said cross slide carriage to move into close proximity to said turret.

9. In a machine tool, a longitudinally extending support, a vertically inclined substantially plate-like portion extending upwardly from said support, vertically spaced longitudinally extending portions supported by said plate-like portion, said portions being triangular in cross section and the apex thereof extending away from said plate-like portion, a lower way supported by the apex of the lower of said portions, an intermediate way supported by the apex of the outer of said portions, said lower way and said intermediate way having major slide supporting surfaces located in a common inclined plane parallel to the plane of said plate-like portion, support means supported by said plate-like portion above said intermediate way and extending longitudinally, an upper way extending parallel to said intermediate way and supported by said plate-like portion, said upper way having a major slide supporting surface which lies in a plane substantially parallel to said plate-like portion, a wall extending upwardly from said support and converging with said plate-like portion adjacent said upper way forming a substantially triangular structure with the apex thereof adjacent said upper way, a rotatable spindle located above said support for rotating a workpiece, a turret carriage mounted on said lower and intermediate ways and movable therealong, a turret rotatably mounted on said carriage and having a plurality of tool supporting surfaces which upon rotation of said turret sequentially take a position wherein each supporting surface lies in a plane perpendicular to the axis of said spindle and faces said spindle, said carriage having a portion which extends beyond the tool supporting surface which faces said spindle, a toolholder operatively connected to one of said tool supporting surfaces, said toolholder being disposed to one side of the spindle axis and adjacent said second way and adapted to support a tool which engages the outer periphery of the workpiece at a point substantially on a line tangent to the workpiece and which intersects the plane of the ways between said ways and the rotation of said workpiece being toward said second way at said point, and supporting pad means disposed at one side of said axis located on said portion of said carriage adjacent said second way intermediate said toolholder and said second way, said toolholder having a bearing surface which engages said supporting pad means on said carriage when the tool supporting surface of the turret on which said toolholder is mounted is rotated into position facing said spindle and the tools supported thereby operate on the outer periphery of the workpiece and forces created by the tool engaging the outer periphery of the workpiece are transmitted through said pad means to said second way.

References Cited in the file of this patent

UNITED STATES PATENTS

| | | |
|---|---|---|
| 197,999 | Coulter | Dec. 11, 1877 |
| 267,480 | Beers | Nov. 14, 1882 |
| 291,971 | Atwood | Jan. 15, 1884 |
| 475,163 | Spears | May 17, 1892 |
| 917,468 | Libby et al. | Apr. 6, 1909 |
| 1,187,099 | Rogers | June 13, 1916 |
| 1,455,558 | Wormser | May 15, 1923 |
| 1,680,088 | Craig | Aug. 7, 1928 |
| 1,901,522 | Meier et al. | Mar. 14, 1933 |
| 2,119,029 | Senger | May 31, 1938 |
| 2,220,425 | Potter | Nov. 5, 1940 |
| 2,255,739 | Curtis | Sept. 9, 1941 |
| 2,268,214 | Irtenkauf | Dec. 30, 1941 |
| 2,642,650 | Clark | June 23, 1953 |
| 2,652,737 | Longstreet | Sept. 22, 1953 |
| 2,680,281 | Montgomery et al. | June 8, 1954 |
| 2,713,283 | Lomazzo | July 19, 1955 |
| 2,734,415 | Mobius | Feb. 14, 1956 |

FOREIGN PATENTS

| | | |
|---|---|---|
| 684 | Germany | Sept. 18, 1877 |
| 324,544 | Germany | Sept. 1, 1920 |
| 644,182 | Germany | Apr. 26, 1937 |
| 937,700 | France | Mar. 15, 1948 |